United States Patent [19]
Qian et al.

[11] Patent Number: 5,838,830
[45] Date of Patent: Nov. 17, 1998

[54] VERTEX-BASED HIERARCHICAL SHAPE REPRESENTATION AND CODING METHOD AND APPARATUS

[75] Inventors: Richard J. Qian, Vancouver; M. Ibrahim Sezan, Camas, both of Wash.

[73] Assignee: Sharp Laboratories of America, Inc., Camas, Wash.

[21] Appl. No.: 825,646

[22] Filed: Apr. 3, 1997

Related U.S. Application Data

[60] Provisional application No. 60/026,276 Sep. 18, 1996.
[51] Int. Cl.$^6$ ............................................. G06K 9/00
[52] U.S. Cl. ................................. 382/243; 382/240
[58] Field of Search ............................... 382/243, 190, 382/180, 203, 198, 201, 202, 205, 304, 308, 173, 181, 195, 196, 197, 199, 204, 209, 224, 226, 228, 232, 233, 235, 239, 240, 241, 242, 251, 282, 283, 293, 307; 345/423

[56] References Cited

U.S. PATENT DOCUMENTS

| 5,524,064 | 6/1996 | Oddou et al. | 382/180 |
| 5,579,471 | 11/1996 | Barber et al. | 395/326 |
| 5,764,814 | 6/1998 | Chen et al. | 382/243 |

OTHER PUBLICATIONS

Fischler et al., Perceptual Organization and Curve Partitioning, IEEE Transactions on Pattern Analysisand Machine Intelligence, vol. PAMI–8, No. 1, pp. 100–105, Jan. 1, 1986.
Hager et al., Real–Time Tacking of Image Regions with Changes in Geometry and Illumination, Proc. Int. Conf. Computer Vision and Pattern Recognition, pp. 403–410, San Francisco, Ca, 1996.
Core Experiments on MPEG–4 Video Shape Coding, International Organisation for Standardisation: Coding of Moving Pictures and Audio Information, ISO/IEC JTC1/SC29/WG11 N1382, Nov. 11, 1996. No Page Number.
Qian et al., Object Detection Using Hierarchical MRF and MAP Estimation, Proc. Computer Vision and Pattern Recognition, Puerto Rico, Jun. 1997.

*Primary Examiner*—Leo H. Boudreau
*Assistant Examiner*—Bijan Tadayon
*Attorney, Agent, or Firm*—Robert D. Varitz, P.C.

[57] ABSTRACT

A method of vertex-based hierarchical shape representation and coding includes selecting an image of interest, defining a boundary about an object of interest within the image of interest, wherein the boundary is defined by a set of contour points, selecting a number of layers, each layer having a predefined saliency parameter associated therewith, wherein the saliency parameter defines a range of layers from a most salient layer to a least salient layer, identifying the most salient contour points in the boundary and placing the most salient contour points in the most salient layer, identifying the next most salient contour points in the boundary and placing the next most salient contour points in the next most salient layer until all of the selected layers have contour points placed therein, and hierarchically storing the layers in a database. A vertex-based hierarchical shape representation and coding system includes an image input which contains and image of interest, an analyzer to select an object of interest within the image, a manipulation mechanism to define a boundary about the object of interest and define a set of contour points on that boundary, and a selections mechanism to place selected contour points into hierarchical layers of like salient contour points.

9 Claims, 3 Drawing Sheets

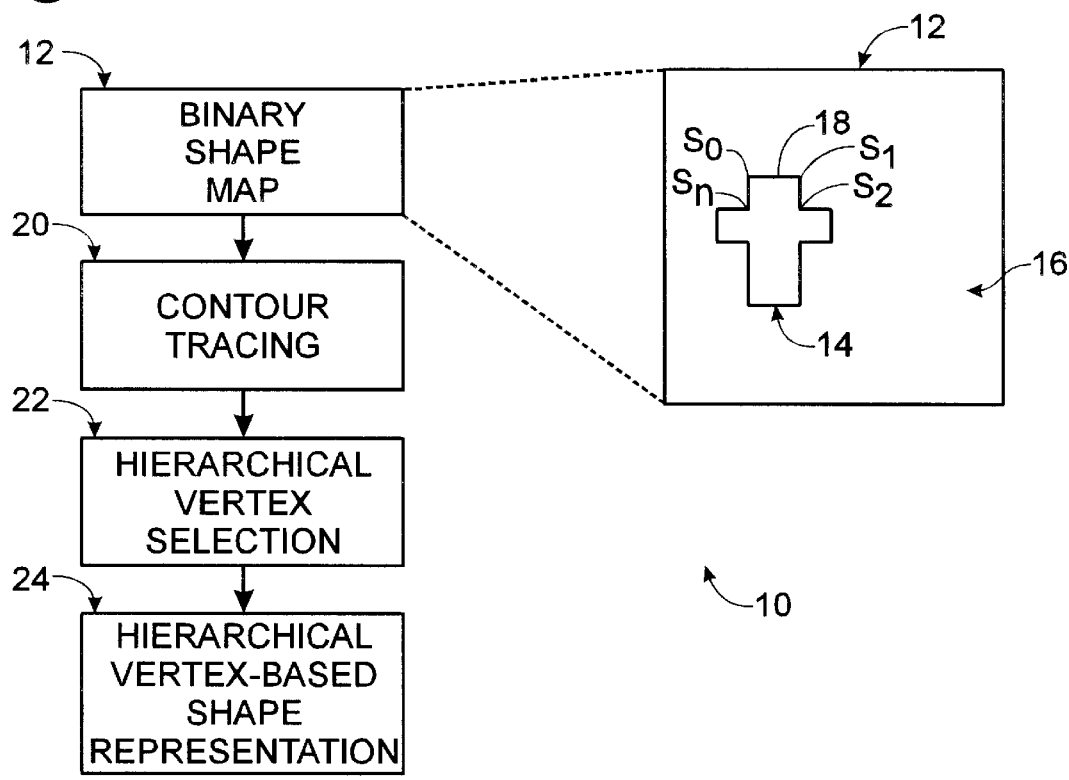
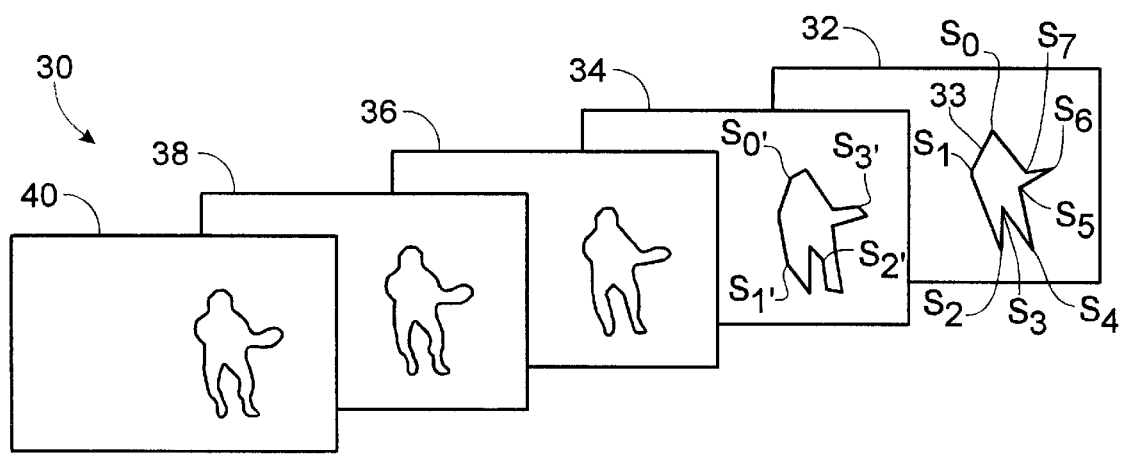

VERTEX-BASED HIERARCHICAL SHAPE REPRESENTATION AND CODING METHOD AND APPARATUS

This case is related to provisional application No. 60/026,276, filed Sep. 18, 1996.

FIELD OF THE INVENTION

This invention relates to the representation and coding of the shape of a video object, and specifically to a method of and apparatus for coding video objects by reference to vertices along a shape contour of a video object, and the placement of different sets of vertices into various, hierarchical levels.

BACKGROUND OF THE INVENTION

Content based coding and manipulation is one of the core functionalities supported by the emerging MPEG4 standard. This functionality requires representation and coding of arbitrarily shaped image objects, where the coding problem may be separated into texture and shape (contour) coding.

Known methods of shape recognition include methods such as that used in the WebSEEk program, which searches a collection of computer files containing image and video data by file type, ie., GIF, MPEG, and text references. The system then decompresses the files, analyses the contents of the files for colors and/or texture. An icon is formed which includes a miniature version of the image, which icons may be examined for specific types of images.

Another shape recognition program is known as Query by Image Content (QBIC), which is an IBM® product. QBIC examines an image file for color, contrast, coarseness and directionality. Only limited shape information is made available during image analysis, and the image is analyzed as a whole. The known methods are quite slow, are resource intensive, and do not readily enable searching by shape criteria. The method and apparatus of the invention are intended to overcome these limitations.

SUMMARY OF THE INVENTION

This invention describes a new method of shape representation and coding. In particular, a novel hierarchical contour representation method, and a hierarchical shape coding algorithm based on that representation is disclosed. The representation is vertex based, i.e., a contour is represented by a finite set of vertices on the contour.

The hierarchical shape coding method is intended to be used within the framework of the emerging MPEG4 standard. The MPEG4 Shape Coding Core Experiments (MPEG4-SCCE) describe a non-hierarchical vertex-based shape coding method comprising the steps of vertex selection, vertex encoding, temporal prediction by vertex list update, polygonal contour reconstruction, reconstruction error encoding.

The proposed shape coding method may be viewed as a hierarchical extension of the vertex method in MPEG4-SCCE. The vertex selection method used in MPEG4-SCCE may be modified to extract vertices in a hierarchical manner, however, that method does not necessarily select visually salient vertices. By replacing the MPEG4-SCCE method with the hierarchical salient vertex selection method described herein, visually salient vertices may be selected. Furthermore, vertex encoding in the instant invention is also modified accordingly to reflect a hierarchical representation. In particular, the contour is represented by a set of vertices each of which is associated with a certain hierarchy layer.

The method of the invention includes selecting an image of interest, defining a boundary about an object of interest within the image of interest, wherein the boundary is defined by a set of contour points, selecting a number of layers, each layer having a predefined saliency parameter associated therewith, wherein the saliency parameter defines a range of layers from a most salient layer to a least salient layer, identifying the most salient contour points in the boundary and placing the most salient contour points in the most salient layer, identifying the next most salient contour points in the boundary and placing the next most salient contour points in the next most salient layer until all of the selected layers have contour points placed therein, and hierarchically storing the layers in a database.

The apparatus of the invention includes an image input which contains an image of interest, an analyzer to select an object of interest within the image, a manipulation mechanism to define a boundary about the object of interest and define a set of contour points on that boundary, and a selections mechanism to place selected contour points into hierarchical layers of like salient contour points.

An object of the invention is to provide a method and apparatus to facilitate scalable shape coding of objects in an object-based image and video framework.

Another object of the invention is to provide a method of splitting an image into multiple levels wherein each level includes contour points of a predefined saliency.

Yet another object of the invention is to provide for fast browsing of images stored in a content-based database.

A further object of the invention is to provide a method and apparatus to facilitate recognition of images by shapes therein.

Further objects and advantages of the invention will become apparent as the description which follows is read in connection with the drawings.

BRIEF DESCRIPTION OF THE DRAWINGS

FIG. 1 is a block diagram depicting the method of the invention.

FIG. 2 is a schematic representation of the hierarchical layers used in the invention.

DETAILED DESCRIPTION OF THE PREFERRED EMBODIMENT

Figure 3:
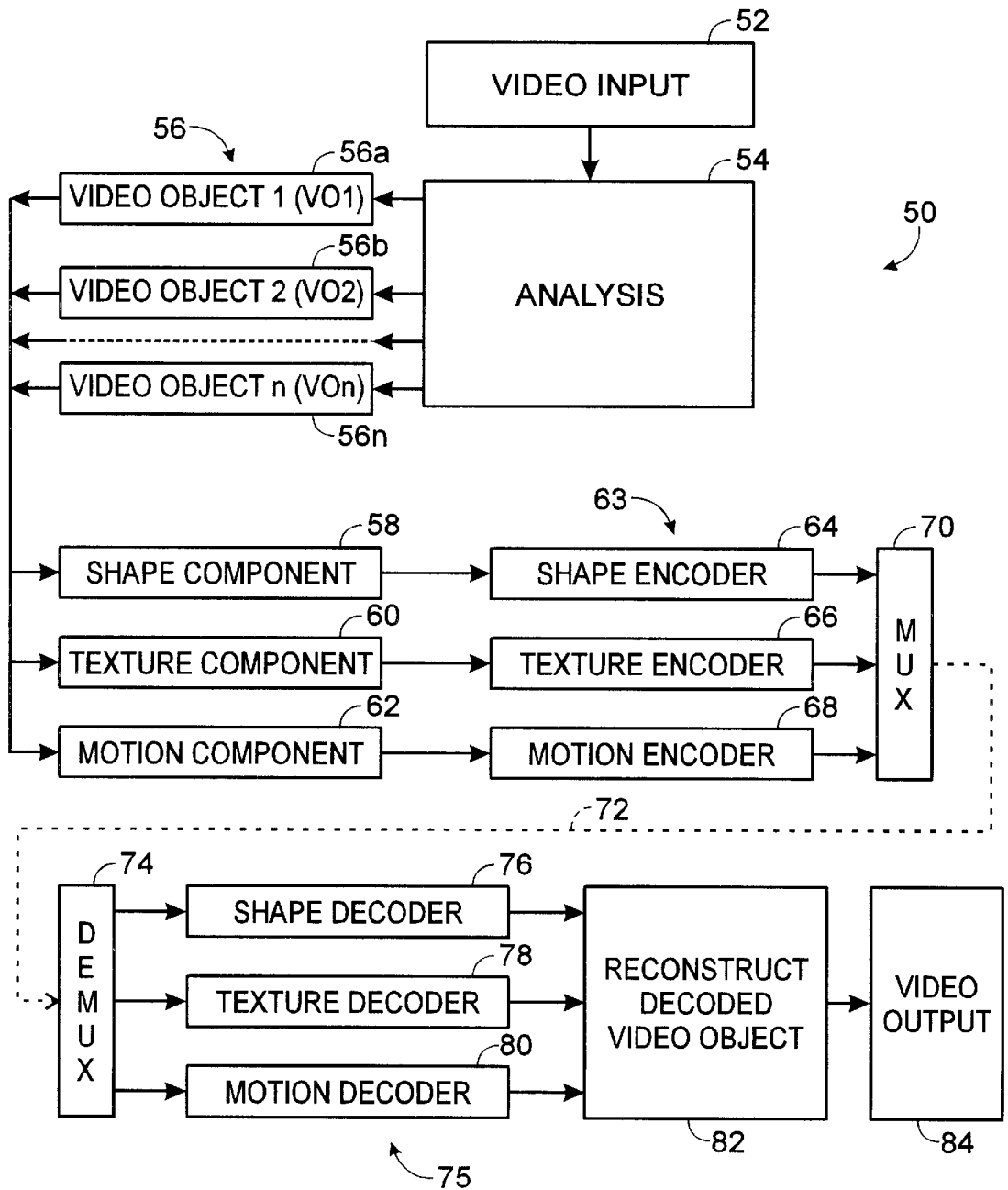
FIG. 3 is a block diagram of the apparatus of the invention.

In this invention, shape is represented via vertices, i.e., points on the shape contour. Such representation is referred to as vertex-based shape representation. FIG. 1 depicts the major steps of determining a hierarchical vertex-based representation, generally at 10, and an image of interest at 12. Shape may be initially represented by a binary shape map where the gray levels corresponding to the video object (VO) 14 of interest is assigned the value of "1" and the remainder 16 of the video image is set to "0". A boundary 18 is established between object 14 and remainder 16. A contour tracing step 20 determines the coordinates of all the pixels, or contour points, that are on boundary 18 of the object of interest 14. Representative vertices, $S_0, S_1, S_2 \ldots S_n$, are selected from this set of contour points. The next two steps, hierarchical vertex selection 22 and hierarchical vertex-based shape representation 24 are described in detail later herein.

The hierarchy, as used herein, is defined in terms of "visual saliency," i.e., significance of a set of vertex points in representing the contour of a video object. At the base hierarchy layer, layer "0", the most salient vertex points are determined, which vertex points capture the most salient features of the shape of the object of interest. At subsequent layers, points of lesser saliency are determined. The set of all vertex points determined at all layers form a hierarchical representation of the contour of the video object in question. Vertex points belonging to different layers reflect different visual saliency. The vertices belonging to the base layer may be used to represent the contour with the least possible number of vertices that are salient. Vertices of subsequent layers may be incrementally added to obtain a representation with increased accuracy.

Hierarchical representation is created by selecting multiple set of vertices where each set constitutes a layer in the hierarchical representation, which is referred to herein as hierarchical vertex selection, 22. Representation by larger number of vertices is obtained by combining the vertices from the higher levels. FIG. 2 depicts a five-layer representation of an example shape, shown generally at 30. The base layer (Layer 0) 32 has eight vertices ($S_00-S_70$) which capture the most salient feature of the shape, 33. The next most salient layer, Layer 1 (34), has four vertices ($S_01-S_31$). The representations in the drawing depict the layers combined in a reconstructed condition, so that the effect of adding more vertices is seen as the shape gains definition. Layer 2 (36) and layer 3(38) have their own sets of vertices which add additional features to the shape, and so on, until the relatively smooth representation of Layer 4 (40) may be seen to depict the outline of a tennis player. The vertices in any designated layer comprise a set of vertices, i.e., Layer 0 has a collection of vertices in Set 1; Layer 2 has a collection of vertices in Set 2, and so on. As depicted in FIG. 2, each layer is shown with the vertices from that layer's set as well as the vertices from the layer sets of more salient layers.

Shape representation is used in object-based image and video compression where image or video objects are coded separately from other objects. The apparatus of the invention, 50, is shown in FIG. 3. Video input 52 is analyzed, block 54, into video objects (VO), 56, such as VO1 (56a), VO2 (56b) . . . VOn (56n). Each VO is defined by its shape component, 58, its texture component, 60, and its motion component, 62. An encoder mechanism 63 includes a shape encoder 64, which encodes a particular representation of the shape, e.g., a vertex-based representation. A texture encoder 66 encodes a representation of the color or texture of the VO while a motion encoder 68 encodes a representation of the motion of the VO. In a bitstream generated by a shape encoder, the vertices belonging to different hierarchical layers are included into a single bitstream, and are encoded together. Alternately, the vertices in each layer may be included in discrete bitstreams, wherein each hierarchical layer is separately encoded. In the case where different sets corresponding to different hierarchical layers are placed in discrete bitstreams, a set of vertices of a selected layer may be predictively coded using vertices from a coarser layer.

Signals representative of the encoded shape, texture and motion are transmitted to a multiplexer 70, retransmitted of a transmission mechanism 72 of an appropriate type to a demultiplexer 74, and then to a decoder 75. Decoder 75 includes a specific shape decoder 76, a texture decoder 78, and a motion decoder 80. The VOs are reformed into a video image by a reconstruction mechanism 82, and output as a video image by video output 84. It should be appreciated that once the signals are encoded, they may be transmitted to multiplexer 70, or they may be stored in a database in place of, or in addition to, multiplexer 70, for future use, such as providing fast browsing of images in a database. The stored signals may be reconstructed into images at a later time.

The method and apparatus of the invention facilitate shape recognition and allow reconstruction of an image to varying degrees of fineness, i.e., a representation of the shape of the video object using only those contour points located in Layer 0 will result in a coarse representation when the base layer vertices are decoded and the object is reconstructed. The incorporation of vertices from less salient layers will require reconstruction using more bits, and will result in a representation of higher quality.

There are various different representations of shapes. Binary shape map 12 is a possible representation by itself. Representation by the shape contour 18, and specifically by vertices on the contour ($S_0—S_n$), readily provides a description of the object shape and may be directly used in manipulation of the object.

A hierarchical vertex-based representation is advantageous in many applications. For instance, it facilitates fast browsing through content based image and video databases. The image objects may be reconstructed with their shapes represented with the least number of vertices that are on the other hand most salient. The user may quickly decide to skip to another candidate, when the most salient representation of the shape does not fit what the user is looking for. The user will then consider the next candidate or modify the query. Otherwise, the user will request a reconstruction of the object using additional layers of its shape information to make a decision to retrieve the object in its entirety.

A content-based image and video database may use shape directly as one of the features representing the image content, especially when a shape is a major discriminator among database objects. In such a case, shape may be represented using multiple layers of hierarchy. Fast browsing may be performed on the basis of shape alone, where shape may be progressively refined as needed during browsing. When it is determined that the shape belongs to the desired object(s), the shape and associated texture may be reconstructed at their highest accuracy for presenting the object to the user. In such a database, texture may or may not be represented in a hierarchical manner. In the latter case, texture representation may be associated with the highest quality version of the shape. In such a case, similarity measures, matching criteria can also be executed in a hierarchical manner. For instance, a matching score may be first calculated using the most salient vertices. Further consideration can be based on whether there is a match at this lower level.

The hierarchical vertex representation facilitates scalable shape coding. A shape coding method is described later herein that is intended for use with the emerging MPEG4 audiovisual coding standard. A video object may be made scalable by using the proposed hierarchical contour representation. The bit stream for a video object is quality-scalable in the sense that a decoder, such as decoder 75, may decode the vertices layer by layer, starting from the highest layer. The decoder stops decoding when the desired accuracy for contour rendering is reached. The bit stream is also spatially scalable in the sense that a decoder may decode the vertices layer by layer and use them to reconstruct the encoded shape at different spatial resolutions. The decoder may choose to reconstruct the shape at a low spatial resolution. It can do so by decoding only the base layer of vertices. It can then quantitize the coordinates of the decoded vertices and place the vertices to their nearest nodes on the low resolution grids. When a higher spatial resolution is needed, the decoder can adjust the quantizer accordingly and may also choose to decode some enhancement layers of vertices.

Hierarchical Salient Point Selection Method

The hierarchical vertex selection method 22 is based on visual saliency, and is a hierarchical extension of the method set forth by Fischer and Bolles: Perceptual Organization and Curve Partitioning, IEEE Trans. Patt. Anal. Machine Intell., Vol 8, No. 1, pp100–105, 1986. The method, however, is capable of more accurate contour representation.

The point selection method permits hierarchical extraction of salient points. Each hierarchy layer corresponds to a predefined saliency. The method allows users to specify the total number of layers of vertices to be extracted and the saliency of vertices at each individual layer. The saliency of vertices is determined by a parameter called $D_{max}$, which is a distance measure between a contour point and its nearby chord of the contour, as will be described below.

The shape coding algorithm first extracts salient points at the base layer corresponding to the greatest saliency. Then it recursively extracts salient points in the next layers until the least salient layer is reached. The details of the hierarchical method are described below.

Figure 4:
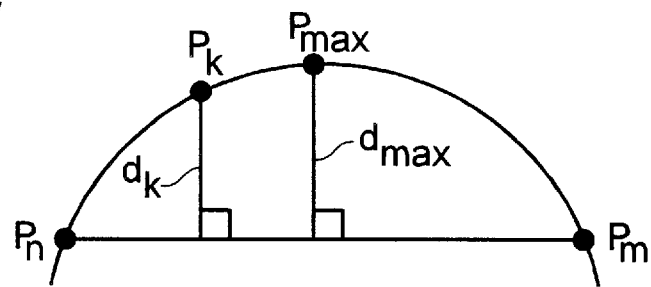
FIG. 4 is a depiction of a step in the hierarchical vertex selection method.

Referring to FIG. 4, assume that the points on a contour are ordered as $P_0, P_1, \ldots, P_{N-1}$. The extracted salient points will be called $S_0[j], S_1[j], \ldots, S_{M(j)-1}[j]$, where j denotes the jth layer. There are three major steps in the method:

Step 1: Initialization.
(1a) Select the total number of layers: L.
(1b) Select the saliency parameter (a predetermined saliency parameter) for each layer, record each predetermined saliency parameter in an array called $D_{max}[L]$.

Step 2: Extract salient points in layer 0 (the most salient layer).
(2a) Start from any point, i.e., $P_n$. Form a straight line between $P_n$ and $P_m = P_{n+2}$. Compute the distance $d_k$ between each contour point $P_k$, where n<k<m, and the straight line. (See FIG. 4) Choose the largest distance $d_{max}$ from $d_k$, where n<k<m. If $d_{max} \geq D_{max}[0]$, record $P_{max}$ as a salient point at layer 0, i.e., $S_0[0]$, then go to step (2b). If $d_{max} < D_{max}[0]$, move $P_m$ to its next contour point, i.e., $P_m = P_{m+1}$ and repeat the above process until a salient point is found.
(2b) Use $S_0[0]$ as a start point as $P_n$ in step (2a) and repeat the process in step (2a) until the next salient point $S_1[0]$ is found. Then use $S_1[0]$ as a start point and repeat the process until the next salient point is found, or the process searches back to $S_0[0]$. Go to Step 3.

Step 3: Extract salient points in layer J>0.
(3a) Within the contour segment between each pair of adjacent salient points in the previous layer, i.e., $S_i[j-1]$ and $S_{i+1}[j-1]$, repeat the salient point extraction process as in Step 2 but using $D_{max}[1]$. Record the extracted salient points as $S_0[j], S_1[j], \ldots, S_{M(j)}[j]$.
(3b) Repeat (3a) until j=L—1. Then stop.

The relationship between saliency and the value of the parameter $D_{max}$ is illustrated in FIG. 4, where it is seen that the selected vertices at layers with larger $D_{max}$ tend to capture more significant characteristics of the shape while those with smaller $D_{max}$ tend to capture more subtlety of the shape.

A modified form of the method uses an iterative refinement method for determining hierarchical vertices, and is set forth as follows:

Step 1: Initialization.
(1a) Select the total number of layers: L.
(1b) Select the saliency parameter (a predetermined saliency parameter) for each layer, record the predetermined saliency parameters in an array called $D_{max}[L]$.

Step 2: Extract vertices in layer 0 (the most salient layer).
(2a) Find the pair of points on the contour that have the largest distance in between. If the distance is greater than $D_{max}[0]$, select the two points as vertices in Layer 0. Otherwise, stop with no vertex selected. If the two points are selected as vertices, connect them with a line segment. Along each side of the contour, find the point that has the largest perpendicular distance from the line segment. If the distance is greater than $D_{max}[0]$, select the point as a new vertex in Layer 0. This process is repeated along each resulting line segment until no contour point having a perpendicular distance greater than $D_{max}[0]$.

Step 3: Extract vertices in layer j>0.
(3a) Repeat the vertex selection process in Step 2 but substituting $D_{max}[0]$ with $D_{max}[j]$. The selected vertices are recorded as vertices in layer j.
(3b) Repeat (3a) until j=L—1. Then stop.

Hierarchical Shape Coding

Figure 5:
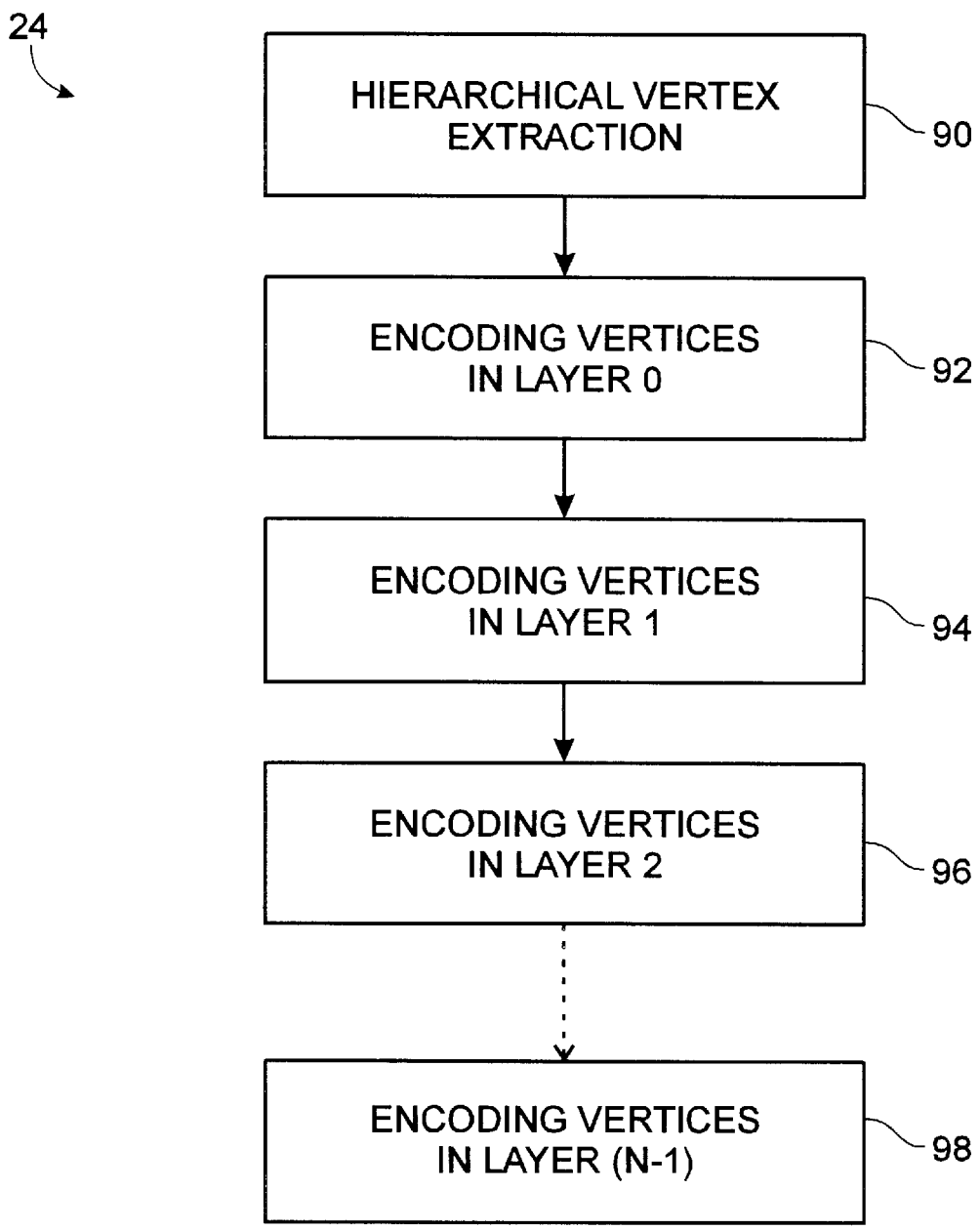
FIG. 5 is a block diagram of a hierarchical shape coding method.

Referring now to FIG. 5, a block diagram depicting hierarchical vertex representation based on salient vertex selection is presented, generally at 24. As described above, such a representation enables hierarchical shape coding. The hierarchical shape coding method is intended to be used within the framework of the emerging MPEG4 standard. The MPEG4-SCCE describes a non-hierarchical vertex-based shape coding method comprising the steps of polygonal vertex selection, vertex encoding, temporal prediction by vertex list update, polygonal contour reconstruction, reconstruction error encoding.

The shape coding method may be viewed as a hierarchical extension of the method in MPEG4-SCCE. The vertex selection method used in MPEG4-SCCE may be modified to extract vertices in a hierarchical manner, however, that method does not necessarily select visually salient vertices. By replacing the MPEG4-SCCE method with the hierarchical salient vertex selection method described herein, as shown in FIG. 1, block 22, visually salient vertices may be selected. The selected vertices are extracted into layers, 90, and encoded layer-by-layer for n—1 layers, 92, 94, 96 and 98, as shown in FIG. 5, where, for example, n>3. Furthermore, vertex encoding in the instant invention is also modified accordingly to reflect a hierarchical representation. In particular, the contour is represented by a set of vertices each of which is associated with a certain hierarchy layer. Each vertex is described by its coordinates and its layer number.

Syntax

The scalable shape coding method requires an extension of the vertex-based MPEG4-SCCE syntax. The extended syntax is given in Tables 1–3, as follows:

TABLE 1 shape_coding( ) syntax

```
shape_coding( ) {
        if (video_object_layer_shape != '00') {
                shape_saac_on                                              1    bslbf
                if (shape_saac_on == '1') reconstruct_shape_error          1    bslbf
                hierarchical_vertex_representation                         1    bslbf
                if (VOP_prediction_type == '00') intra_shape_coding( )
                else if (VOP_prediction_type == '01')
inter_shape_coding ( )
        }
        else if (video_object_layer_shape == '10') {
                do {
                        gray_shape_coding ( )
                } while (macroblock count != total_macroblock_count)
        }
}
```

TABLE 2 intra_shape_coding( ) syntax

```
intra_shape_coding ( ) {
        number_of_contours                                                 3m, m > 0   uimsbf
        initial_vertex_coding ( )
        if (!hierarchical_vertex_representation) {
                for (c=0; c < number_of_contours; c++) {
                        contour_type                                       1–2         vlclbf
                        contour_coding_mode                                2           uimsbf
                        if (contour_coding_mode == '00') polygon_coding( )
                        else if (contour_coding_mode == '01')
all_chain_coding( )
                        else if (contour_coding_mode == '10')
boundary_chain_coding( )
                }
        }
        else {
                number_of_vertex_layers                                    2           uimsbf
                for (h=0; h < number_of_vertex_layers; h++) {
                        for (c=0; c < number_of_contours; c++) {
                                hierarchical_intra_contour_coding(h)
                        }
                }
        }
}
```

TABLE 3 inter_shape_coding( ) syntax

```
inter_shape_coding (h) {
        diff_contour_number                                                2–30    vlclbf
        shape_motion_vtr ( )                                               2–18    vlclbf
        if (!hierarchical_vertex representation) {
                gfs_flag                                                   1       uimsbf
                if (gfs_flag == '1') global_flag_status                    L       uimsbf
                contour_flag                                               M       uimsbf
```

TABLE 3-continued inter_shape_coding( ) syntax

```
                contour_flag_status                                              N       uimsbf
                for(i=0; i < L; i++) {
                    if ((gfs_flag == '1' && ith bit of
global_contour_flags ==
                                        '0' || gfs_flag == '0') {
                        if (ith bit of contour_flags == '1') {
                            contour_motion_vtr ( )                              2–18     vlclbf
                            if (ith bit of contour_flag_statuses == '0') {
                                major_vtx_coding ( )
                                minor_vtx_coding( )
                            }
                        }
                    }
                }
                for (i=0; i < num_intra_contour; i++) {
                    intra_contour_coding ( )
                }
        }
        else {
            for (h=0; h < number_of_vertex_layers; h++) {
                global_predication_flag(h)                                        L       uimsbf
                local_prediction_flag (h)                                         L       uimsbf
                for (c=0; c < number_of_previous_contours; c++) {
                    hierarchical_inter_contour_coding (h)
                }
                for (c=0; c < diff_contour_number; c++) {
                    hierarchical_intra_contour_coding (h)
                }
            }
        }
}
```

In the above tables, "saac" denotes syntax adaptive arithmetic coding, "bslbf" denotes binary string left bit first, "uimsbf" denotes unsigned inter most significant bit first, and "vlclbf" denotes variable length code left bit first.

The extended syntax is backward compatible with the non-hierarchical syntax of MPEG4-SCCE. If the hierarchical_vertex_representation flag is down, i.e., not equal to "1", then the syntax implements the non-hierarchical method.

Scalable Coding

The hierarchical vertex representation allows a decoder to reconstruct a contour at different accuracy by decoding parts of the bit stream, which may be viewed as "accuracy scalability." A decoder may decide on the number of layers of vertices that needs to be used in the reconstruction of a contour to achieve a certain accuracy. For instance, for best possible representation using the least number of vertices, the decoder may choose to decode only the vertices at the base level, i.e., the most salient vertices. For higher accuracy, vertices belonging to less salient levels need to be decoded as well.

A decoder may make this decision in consideration of the available display resolution, for example. A relationship between the saliency parameter $D_{max}$ and the display resolution may be defined to implement spatially scalable shape coding. Because a high resolution display usually reveals more details of a shape, the decoder may decide to use more layers of vertices for such a device. To use more layers of vertices means to include layers of vertices associated with smaller $D_{max}$'s. Therefore, one may define the relationship between the saliency parameter $D_{max}$ and the display resolution such that, as the resolution increases, lower values of $D_{max}$ are required in order to include more layers of vertices.

In a spatially-scalable coding application, the decoder reconstructs a spatially lower resolution of the video objects, and hence a spatially lower resolution of the video images. In other words, the texture and shape is reconstructed at a lower spatial resolution. In a spatially-scalable coding, the decoder may use the base layer vertices in reconstructing the object shape at lowest spatial resolution; the coordinates of the vertices are scaled down by M, where M denotes the factor of spatial resolution reduction in both horizontal and vertical dimensions. For instance, M can be 2, 4, or any integer.

Quality scalability is also referred to as "accuracy scalability". Spatial scalability is tied to the $D_{max}$ parameter, which is a more general statement of the method.

Content-scalable shape coding is achieved by representing important parts of the contour by a greater number of layers. Important parts of the contour are those parts that surround important parts of the objects, such as the face of a human subject.

Although a preferred embodiment of the method and apparatus of the invention have been disclosed herein, is will be appreciated that modifications and variations may be made thereto without departing from the scope of the invention as defined in the appended claims.

We claim:

1. A method of vertex-based hierarchical shape representation and coding comprising:

selecting an image of interest;

defining a representation of the shape of the image of interest;

establishing a boundary between the object of interest and the remainder of the image of interest;

tracing the contour of the image of interest to determine the coordinates of all of a collection of contour points on the contour;

determining a number of hierarchical layers in which the contour points will be stored;

selecting the most salient contour points on the contour;

storing the most salient contour points in a base hierarchical layer;

storing less salient contour points in successive less salient hierarchical layers; and building a content-based data base of shape-representative hierarchical layers.

2. The method of claim 1 wherein said selecting the salient contour points for any layer includes selecting a predetermined saliency parameter for each layer, and recording each predetermined saliency parameter in an array of saliency parameters; extracting salient contour points in a layer by locating selected contour points located at greater than a preselected distance from a line connecting the contour points on either side of the selected contour point.

3. The method of claim 1 wherein said selecting the salient contour points for any layer includes using an iterative refinement method for determining hierarchical vertices.

4. The method of claim 1 which includes scalable shape coding.

5. A method of vertex-based hierarchical shape representation and coding comprising:

selecting an image of interest;

defining a boundary about an object of interest within the image of interest, wherein the boundary is defined by a set of contour points;

selecting a number of layers, each layer having a predefined saliency parameter associated therewith, wherein the saliency parameter defines a range of layers from a most salient layer to a least salient layer;

identifying the most salient contour points in the boundary and placing a set of the most salient contour points in the most salient layer;

identifying the next most salient contour points in the boundary and placing a set of the next most salient contour points in the next most salient layer until all of the selected layers have contour points placed therein; and hierarchically storing the layers in a database.

6. The method of claim 5 wherein said defining a boundary includes analyzing the shape of an image of interest as represented by a binary shape map.

7. The method of claim 5 which further includes scalable shape coding.

8. An apparatus for providing shape representation and coding of a video image comprising:

a video input which contains an image of interest;

an analyzer to select an object of interest within the image and to form a video object therefrom;

a manipulation mechanism to split the video image into a shape component, a texture component and a motion component, and to define a boundary about the shape component of the object of interest and define a set of contour points on that boundary;

a selection mechanism to place selected contour points into hierarchical layers of like salient contour points;

an encoder to encode the components of the video object into signals representative of said components;

a multiplexer to multiplex said signals representative of said components;

a transmission mechanism to transmit said multiplexed, encoded signals;

a demultiplexer to demultiplex said multiplexed, encoded signals;

a decoder to decode said encoded signals;

a reconstruction mechanism to reconstruct the decoded component signals into a video image; and a video output to output a reconstructed video image.

9. The apparatus of claim 8 which includes a database for containing representations of video objects, wherein said representations comprise at least the most salient layer of a video object.

* * * * *